US012640861B2

(12) United States Patent
Liu et al.

(10) Patent No.: US 12,640,861 B2
(45) Date of Patent: May 26, 2026

(54) GROUP BASED BEAM REPORT FOR MULTI-TRANSMISSION REFERENCE POINT (TRP) TRANSMISSION

(71) Applicant: Lenovo (Beijing) Limited, Beijing (CN)

(72) Inventors: Bingchao Liu, Beijing (CN); Chenxi Zhu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 327 days.

(21) Appl. No.: 18/290,208

(22) PCT Filed: May 10, 2021

(86) PCT No.: PCT/CN2021/092638

§ 371 (c)(1),
(2) Date: Nov. 10, 2023

(87) PCT Pub. No.: WO2022/236537

PCT Pub. Date: Nov. 17, 2022

(65) Prior Publication Data

US 2024/0267174 A1 Aug. 8, 2024

(51) Int. Cl.
*H04L 5/00* (2006.01)
*H04W 24/10* (2009.01)

(52) U.S. Cl.
CPC ............ *H04L 5/0035* (2013.01); *H04L 5/005* (2013.01); *H04L 5/0053* (2013.01); *H04W 24/10* (2013.01)

(58) Field of Classification Search
CPC .............................. H04L 5/0035; H04W 24/10
See application file for complete search history.

(56) References Cited

U.S. PATENT DOCUMENTS

2019/0190582 A1* 6/2019 Guo ...................... H04B 17/327
2019/0306924 A1 10/2019 Zhang et al.
(Continued)

FOREIGN PATENT DOCUMENTS

CN 111800243 A 10/2020
CN 111970726 A 11/2020
(Continued)

OTHER PUBLICATIONS

OPPO , "Remaining Issues on Multi-beam Operation Enhancement", 3GPP TSG RAN WG1 #100, R1-2000458, e-Meeting [retrieved Jan. 26, 2024]. Retrieved from the Internet <https://www.3gpp.org/ftp/tsg_ran/WG1_RL1/TSGR1_100_e/Docs>, Feb. 2020, 8 pages.
(Continued)

*Primary Examiner* — Zhiren Qin
(74) *Attorney, Agent, or Firm* — FIG. 1 Patents

(57) ABSTRACT

Methods and apparatuses for group based beam report for multi-TRP transmission are disclosed. A method comprises receiving a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and transmitting a CSI report including N pairs of CRIs or SSBRIs and the measured L1-RSRP value of the resource indicated by each of the N pairs of CRIs or SSBRIs.

20 Claims, 4 Drawing Sheets

(56)     References Cited

U.S. PATENT DOCUMENTS

| | | |
|---|---|---|
| 2020/0322023 A1 | 10/2020 | Kung et al. |
| 2021/0058930 A1 | 2/2021 | Zhou et al. |
| 2023/0075610 A1* | 3/2023 | Matsumura ........... H04L 5/0053 |
| 2023/0081169 A1* | 3/2023 | Matsumura ........ H04B 7/06952 |
| | | 370/329 |
| 2023/0189270 A1* | 6/2023 | Matsumura ........ H04B 7/06952 |
| | | 370/329 |
| 2024/0063870 A1* | 2/2024 | Gao ...................... H04L 5/0057 |
| 2024/0072868 A1* | 2/2024 | Sun ...................... H04B 7/0639 |

FOREIGN PATENT DOCUMENTS

| | | |
|---|---|---|
| CN | 112368967 A | 2/2021 |
| CN | 112672378 A | 4/2021 |

OTHER PUBLICATIONS

PCT/CN2021/092638 , "International Preliminary Report on Patentability", PCT Application No. PCT/CN2021/092638, Nov. 23, 2023, 6 pages.

PCT/CN2021/092638 , "International Search Report and Written Opinion", PCT Application No. PCT/CN2021/092638, Feb. 10, 2022, 7 pages.

"Extended European Search Report", EP Application No. 21941114. 7, Dec. 4, 2024, 12 pages.

Intel Corporation, "Multi-TRP enhancements for beam management", 3GPP TSG RAN WG1 #102-e, R1-2005861, e-Meeting, Aug. 2020, 4 pages.

* cited by examiner

300

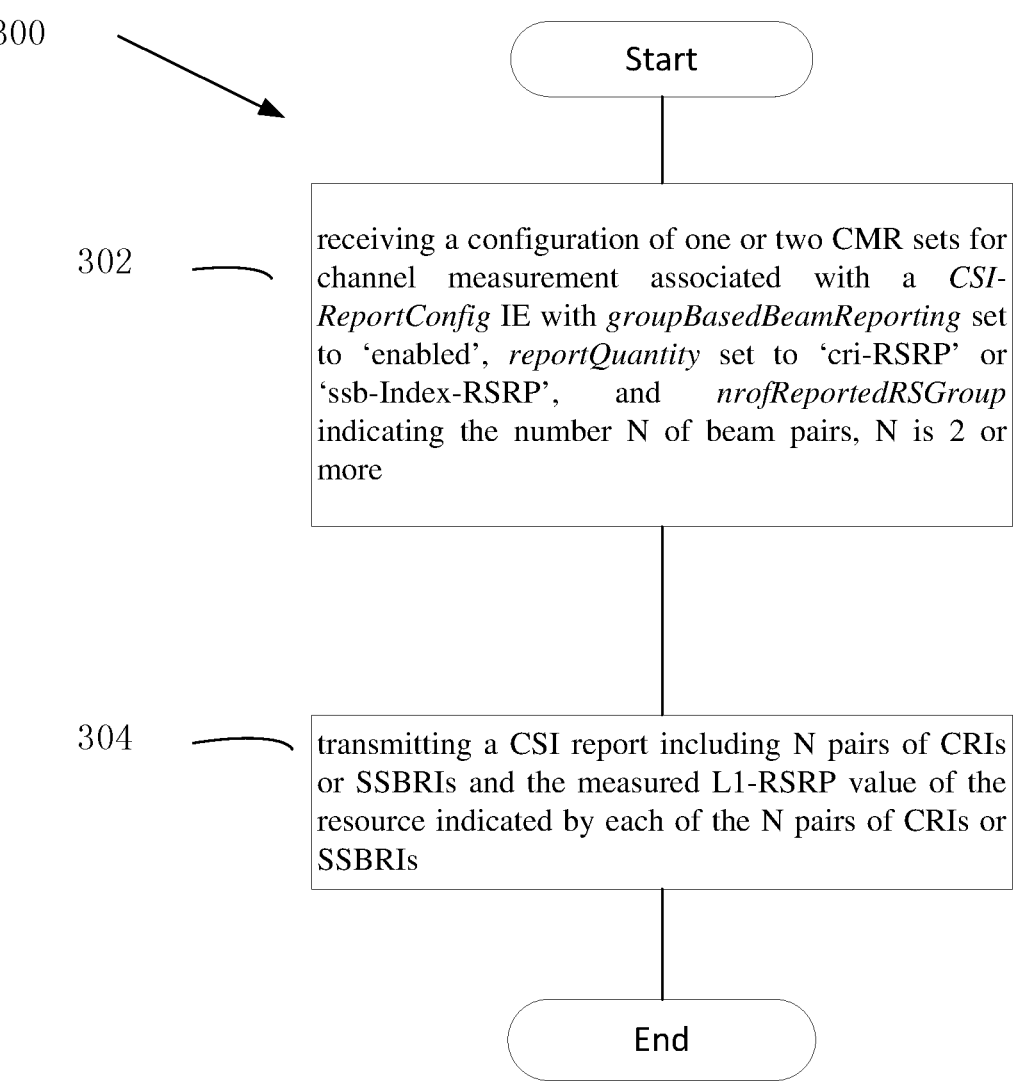

Start

302 receiving a configuration of one or two CMR sets for channel measurement associated with a *CSI-ReportConfig* IE with *groupBasedBeamReporting* set to 'enabled', *reportQuantity* set to 'cri-RSRP' or 'ssb-Index-RSRP', and *nrofReportedRSGroup* indicating the number N of beam pairs, N is 2 or more

304 transmitting a CSI report including N pairs of CRIs or SSBRIs and the measured L1-RSRP value of the resource indicated by each of the N pairs of CRIs or SSBRIs End

Figure 3

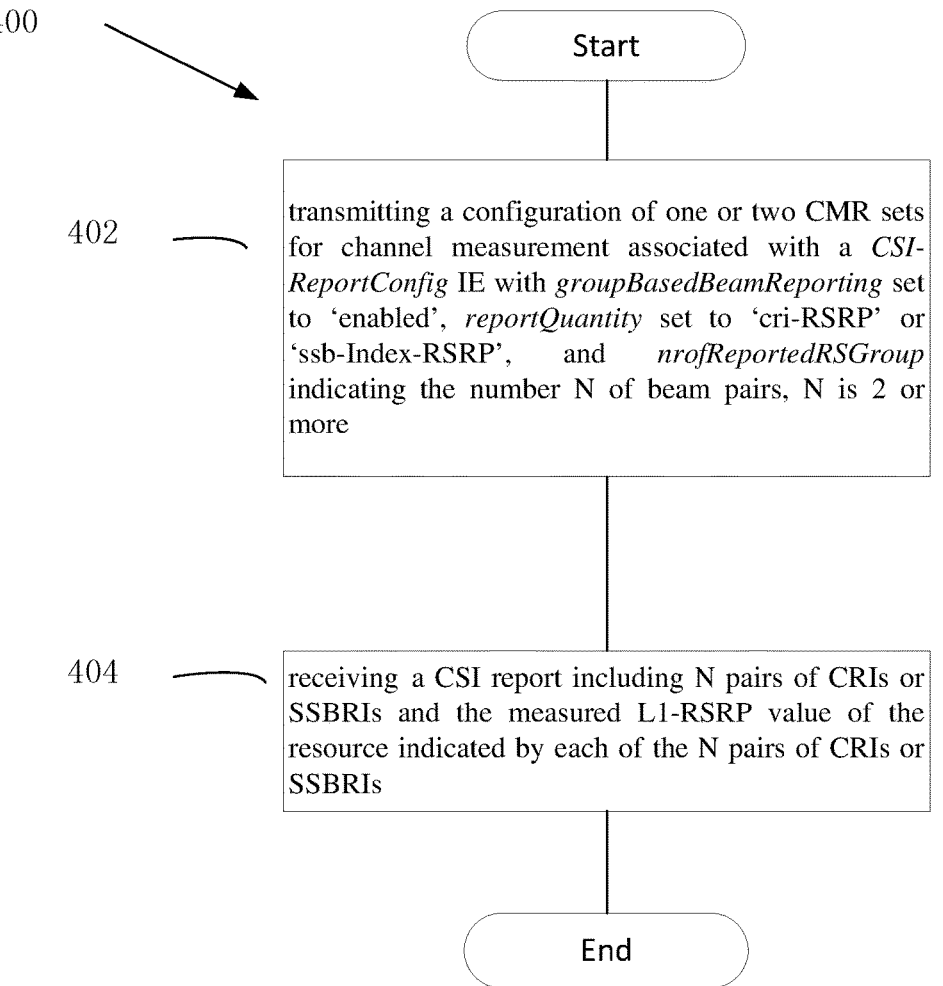

400

Start

402 transmitting a configuration of one or two CMR sets for channel measurement associated with a *CSI-ReportConfig* IE with *groupBasedBeamReporting* set to 'enabled', *reportQuantity* set to 'cri-RSRP' or 'ssb-Index-RSRP', and *nrofReportedRSGroup* indicating the number N of beam pairs, N is 2 or more

404 receiving a CSI report including N pairs of CRIs or SSBRIs and the measured L1-RSRP value of the resource indicated by each of the N pairs of CRIs or SSBRIs End

Figure 4

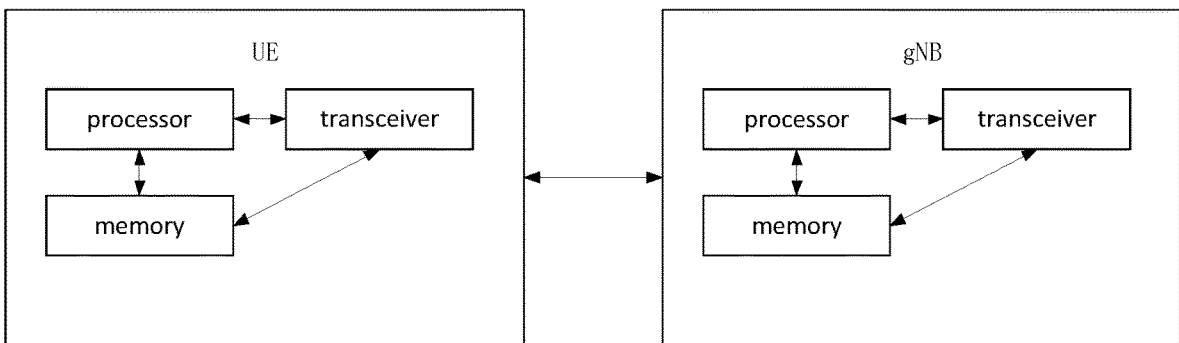

Figure 5

GROUP BASED BEAM REPORT FOR MULTI-TRANSMISSION REFERENCE POINT (TRP) TRANSMISSION

FIELD

The subject matter disclosed herein generally relates to wireless communications, and more particularly relates to methods and apparatuses for group based beam report for multi-TRP transmission.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Channel State Information (CSI), Channel State Information Reference Signal (CSI-RS), CSI-RS Resource Indicator (CRI), Synchronization Signal Block (SSB), SSB resource indicator (SSBRI), Downlink control information (DCI), Transmission Reference Point (TRP), Physical Downlink Shared Channel (PDSCH), Reference Signal Receiving Power (RSRP), Layer 1 Reference Signal Received Power (L1-RSRP), channel measurement resource (CMR), non zero power (NZP), CSI-RS resource set indicator (CRSI), SSB resource set indicator (SSBRSI), Information Element (IE).

Basic function of group based beam report has been specified in NR Release 15. If the UE is configured with the higher layer parameter groupBasedBeamReporting set to 'enabled', the UE shall report two different CRIs or two different SSBRIs in a single CSI reporting instance, where two CSI-RS or SSB resources corresponding to the two reported CRIs or SSBRIs can be received simultaneously by the UE either with a single spatial domain receive filter, or with multiple simultaneous spatial domain receive filters.

Single-DCI and multi-DCI based multi-TRP DL transmissions are specified in NR Release 16, where a UE may be required to simultaneously receive one PDSCH transmission or two PDSCH transmissions from two TRPs with different beams in FR2. It means that multiple pairs of beams, which can be simultaneously received by the UE, are required for the UE.

Additionally, it has been agreed that two or more pairs of beams can be reported in a CSI report to support multi-TRP DL transmission.

This disclosure targets the configuration for beam management in multi-TRP scenario.

BRIEF SUMMARY

Methods and apparatuses for group based beam report for multi-TRP transmission are disclosed.

In one embodiment, a method comprises receiving a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and transmitting a CSI report including N pairs of CRIs or SSBRIs and the measured L1-RSRP value of the resource indicated by each of the N pairs of CRIs or SSBRIs.

In one embodiment, two CMR sets, each of which consists of the same number of resources, are configured, and the CSI report further includes a CRSI or SSBRSI indicating the CMR set to which the first reported CRI or SSBRI belongs. The bit width of each CRI or SSBRI is determined by $\lceil \log_2(K_s) \rceil$, where $K_s$ is the number of the resources within each CMR set. The resource indicated by the $(2n-1)^{th}$ reported CRI or SSBRI and the resource indicated by the $(2n)^{th}$ reported CRI or SSBRI are from different CMR sets and can be received simultaneously by the UE either with a single spatial domain receive filter or with multiple simultaneous spatial domain receive filters, where $n=1, 2, \ldots, N$. All of the resources indicated by the first N reported CRIs or SSBRIs are from one CMR set of the two CMR sets, and all of the resources indicated by the last N reported CRIs or SSBRIs are from the other CMR set of the two CMR sets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

In another embodiment, one CMR set including two subsets is configured, the one CMR set consists of $2K_s$ resources, and a first subset consists of first $K_s$ resources, and a second subset consists of last $K_s$ resources. The bit width of each CRI or SSBRI is determined by $\lceil \log_2(2K_s) \rceil$. The resource indicated by the $(2n-1)^{th}$ reported CRI or SSBRI and the resource indicated by the $(2n)^{th}$ reported CRI or SSBRI are from different subsets and can be received simultaneously by the UE either with a single spatial domain receive filter or with multiple simultaneous spatial domain receive filters, where $n=1, 2, \ldots, N$. All of the resources indicated by the first N reported CRIs or SSBRIs are from one subset of the two subsets, and all of the resources indicated by the last N reported CRIs or SSBRIs are from the other subset of the two subsets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

In still another embodiment, the resource indicated by the first reported CRI or SSBRI has the largest measured L1-RSRP value among all resources within the one or two CMR sets, and the largest measured L1-RSRP value is quantized to a 7-bit value in the range [−140, −44] dBm with step size of 1 dB. Each of the measure L1-RSRP values for the resources indicated by the other CRIs or SSBRIs other than the first reported CRI or SSBRI is represented by a differential L1-RSRP value relative to the largest measured L1-RSRP value, and the differential L1-RSRP value is quantized to a 4-bit value with step size of 2 dB.

In one embodiment, a method comprises transmitting a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and receiving a CSI report including N pairs of CRIs or SSBRIs and the measured L1-RSRP value of the resource indicated by each of the N pairs of CRIs or SSBRIs.

In another embodiment, a remote unit (UE) comprises a receiver that receives a configuration of one or two CMR sets for channel measurement associated with a CSI-Report-Config IE with groupBasedBeamReporting set to 'enabled', reportQuantity set to 'cri-RSRP' or 'ssb-Index-RSRP', and nrofReportedRSGroup indicating the number N of beam pairs, N is 2 or more; and a transmitter that transmits a CSI report including N pairs of CRIs or SSBRIs and the measured L1-RSRP value of the resource indicated by each of the N pairs of CRIs or SSBRIs.

In yet another embodiment, a base unit comprises a transmitter that transmits a configuration of one or two CMR sets for channel measurement associated with a CSI-Report-Config IE with groupBasedBeamReporting set to 'enabled', reportQuantity set to 'cri-RSRP' or 'ssb-Index-RSRP', and nrofReportedRSGroup indicating the number N of beam pairs, N is 2 or more; and a receiver that receives a CSI report including N pairs of CRIs or SSBRIs and the measured L1-RSRP value of the resource indicated by each of the N pairs of CRIs or SSBRIs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 3 is a schematic flow chart diagram illustrating an embodiment of a method;

FIG. 4 is a schematic flow chart diagram illustrating a further embodiment of a method; and FIG. 5 is a schematic block diagram illustrating apparatuses according to one embodiment.

DETAILED DESCRIPTION

Figure 1:
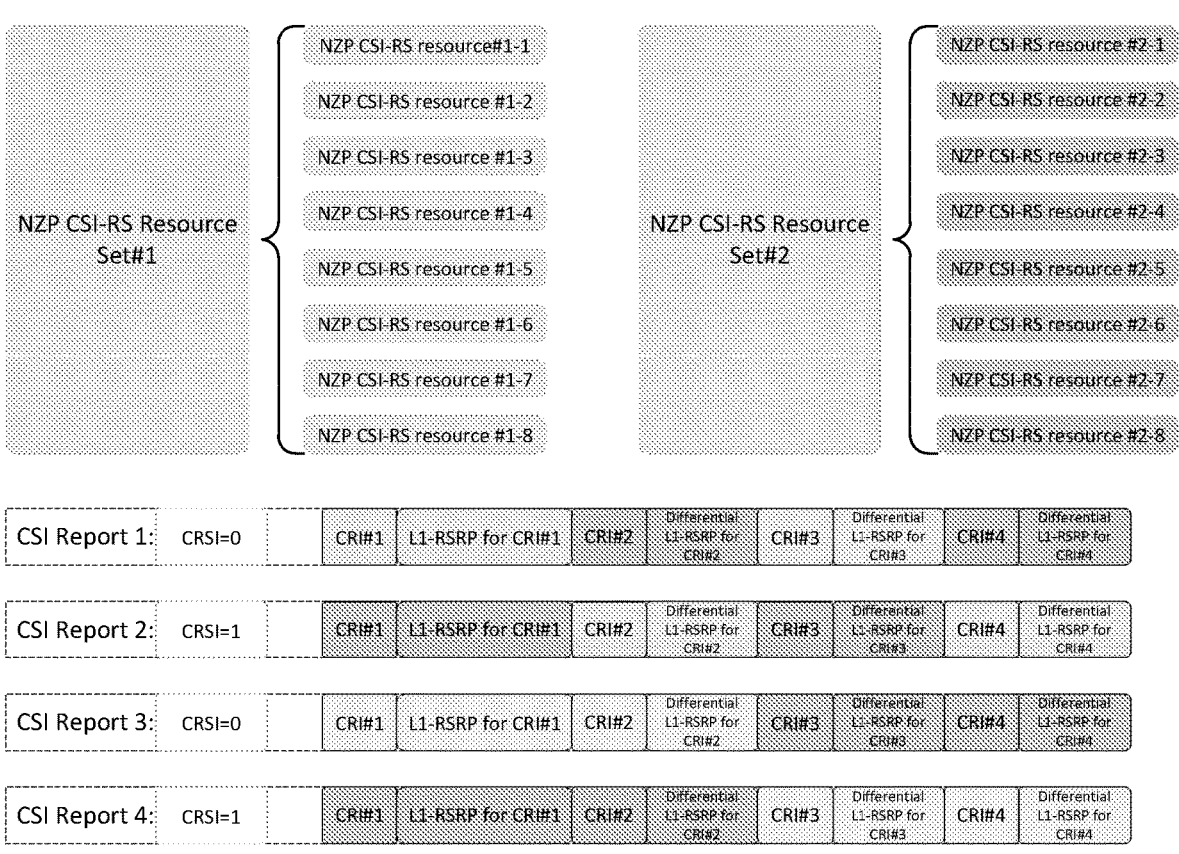
FIG. 1 illustrates an example of the resource setting and the CSI reports according to a first embodiment.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

It has been agreed that N (N>1) beam pairs can be reported in a single CSI report. The resource setting and how to report N beam pairs are discussed in the present disclosure. The resource setting is used to configure the resources and/or the resource sets associated with a CSI reporting. A CSI reporting is configured by the CSI-ReportConfig IE.

According to a first embodiment, two channel measurement resource (CMR) sets are configured in a resource setting for channel measurement.

For a CSI report configured with L1-RSRP reporting, one resource setting is configured for channel measurement. In the one resource setting for channel measurement, two CMR sets having the same number of resources are configured. Each CMR set can be an NZP CSI-RS resource set or a CSI-SSB resource set. Each CMR set corresponds to one TRP, which means that all resources within a same CMR set are transmitted from a same TRP. For example, a first CMR set corresponds to TRP #1 (i.e. the resources within the first CMR set are transmitted from TRP #1), and a second CMR set corresponds to TRP #2 (i.e. the resources within the second CMR set are transmitted from TRP #2). The resource setting for channel measurement is associated with a CSI-ReportConfig IE, which configures a CSI Report and has a higher layer parameter groupBasedBeamReporting (which is used to enable or disable the group based beam reporting for the CSI Report), a higher layer parameter reportQuantity (which configures the report contents in the CSI Report), and a higher layer parameter nrofReportedRSGroup (which configures the number of reported beams or beam groups in the CSI Report). The higher layer parameter groupBasedBeamReporting is set to 'enabled' to enable group based beam report. The higher layer parameter reportQuantity can be set to 'cri-RSRP' which means that each CMR set is an NZP CSI-RS resource set that includes NZP CSI-RS resources, or set to 'ssb-Index-RSRP' which means that each CMR set is a CSI-SSB resource set that includes SSB resources. In the present disclosure, the higher layer parameter nrofReportedRSGroup is used to configure the number (N) of beam pairs reported in the CSI report.

Accordingly, the UE shall report N pairs of CRIs or SSBRIs (i.e. 2N CRIs or SSBRIs) in a CSI report, where each CRI or SSBRI indicates an NZP CSI-RS resource or SSB resource.

In a first configuration of the CSI report according to the first embodiment, the resources indicated by all of the $(2n-1)^{th}$ reported CRIs or SSBRIs are from one of the two CMR sets (n is from 1 to N), and the resources indicated by all of the $(2n)^{th}$ reported CRIs or SSBRIs are from the other of the two CMR sets. In this condition, the resource indicated by each $(2n-1)^{th}$ reported CRI or SSBRI and the resource indicated by each $(2n)^{th}$ reported CRI or SSBRI can be received simultaneously by the UE either with a single spatial domain receive filter, or with multiple simultaneous spatial domain receive filters. A resource indicated by a CRI or SSBRI can be also referred to as a resource corresponding to a CRI or SSBRI.

In a second configuration of the CSI report according to the first embodiment, the first N reported CRIs or SSBRIs indicate resources from one of the two CMR sets, and the last N reported CRIs or SSBRIs indicate resources from the other of the two CMR sets. In this condition, the resource indicated by the $n^{th}$ CRI or SSBRI in the first N reported CRIs or SSBRIs and the resource indicated by the $n^{th}$ CRI or SSBRI in the last N reported CRIs or SSBRIs (n is from 1 to N) can be received simultaneously received by the UE, either with a single spatial domain receive filter, or with multiple simultaneous spatial domain receive filters.

The bit width of each of 2N CRIs or SSBRIs in the CSI report is determined by $\lceil \log_2(K_s) \rceil$, where $K_s$ is the number of the resources (e.g. NZP CSI-RS resources or SSB resources) within each CMR set. $\lceil \log_2(K_s) \rceil$ means the smallest integer that is equal to or larger than $\log_2(K_s)$. Each of 2N CRIs or SSBRIs (CRI #1, CRI #2, . . . , CRI #2N) has a value CRI k (k is from 0 to $K_s-1$). CRI k indicates the configured $(k+1)^{th}$ entry of the NZP CSI-RS resources or SSB resources in the corresponding CMR set. Which one of the two CMR sets is the corresponding CMR set will be discussed later.

An L1-RSRP value or a differential L1-RSRP value of the resource indicated by each of 2N CRIs or SSBRIs is also included in the CSI report. To reduce the L1-RSRP report overhead, differential L1-RSRP reporting is used. In particular, the first reported NZP CSI-RS resource (indicated by the first CRI) or the first reported SSB resource (indicated by the first SSBRI) has the largest measured L1-RSRP value, which is quantized to a 7-bit value in the range [−140, −44] dBm with a step size of 1 dB. Each of the measured L1-RSRP values of the other reported NZP CSI-RS resources or SSB resources than the first reported NZP CSI-RS resource or SSB resource is represented by a differential L1-RSRP value relative to the largest measured L1-RSRP value, where each differential L1-RSRP value is quantized to a 4-bit value with a step size of 2 dB.

Since the largest measured L1-RSRP value may be from any of the two CMR sets. The CMR set ID of the CMR set including the NZP CSI-RS resource or SSB resource having the largest measured L1-RSRP value (indicated by the first CRI or the first SSBRI) is included in the CSI report. In particular, a CSI-RS resource set indicator (CRSI) or a SSB resource set indicator (SSBRSI) is included in the CSI report as the CMR set ID. Therefore, the CMR set ID of the first reported NZP CSI-RS resource or SSB resource (indicated by the first CRI or the first SSBRI) is represented by a CRSI or SSBRSI.

For the first configuration of the CSI report according to the first embodiment, all of the odd reported CRIs or SSBRIs indicate resources from the same CMR set as the first reported CRI or SSBRI; and all of the even reported CRIs or SSBRIs indicate resources from a different CMR set from the first reported CRI or SSBRI. Accordingly, the corresponding CMR set can be determined according to the CMR set ID (CRSI or SSBRSI) included in the CSI report.

For the second configuration of the CSI report according to the first embodiment, all of the first reported N CRIs or SSBRIs indicate resources from the same CMR set as the first reported CRI or SSBRI; and all of the last reported N CRIs or SSBRIs indicate resources from a different CMR set from the first reported CRI or SSBRI. Accordingly, the corresponding CMR set can be determined according to the CMR set ID (CRSI or SSBRSI) contained in the CSI report.

FIG. 1 illustrates an example of the resource setting and the CSI reports according to the first embodiment.

In the example of FIG. 1, the higher layer parameter groupBasedBeamReporting is set to 'enabled' to enable group based beam report.

The higher layer parameter reportQuantity is set to 'cri-RSRP'. Accordingly, the resource setting for channel measurement has two NZP CSI-RS resource sets: NZP CSI-RS resource set #1 containing for example 8 (i.e. $K_s=8$) NZP CSI-RS resources (e.g. NZP CSI-RS resource #1-1, NZP CSI-RS resource #1-2, . . . , NZP CSI-RS resource #1-8); and NZP CSI-RS resource set #2 also containing the same number of (i.e. 8) NZP CSI-RS resources (e.g. NZP CSI-RS resource #2-1, NZP CSI-RS resource #2-2, . . . , NZP CSI-RS resource #2-8).

The higher layer parameter nrofReportedRSGroup is set to 2 (i.e. N=2). Accordingly, the CSI report includes 2N (i.e. 4) CRIs (e.g. CRI #1, CRI #2, CRI #3 and CRI #4) and the L1-RSRP value or differential L1-RSRP values of resources indicated by the 4 CRIs. The bit width of each of CRI #1, CRI #2, CRI #3 and CRI #4 is $\lceil \log_2(K_s) \rceil = \log_2(8) = 3$ bits. The possible values of each of CRI #1, CRI #2, CRI #3 and CRI #4 are CRI 0, CRI 1, . . . , and CRI 7. CRI k (k is a value of any of 0 to 7) indicates NZP CSI-RS resource #1−(k+1) or NZP CSI-RS resource #2−(k+1) depending on the value of CRSI. For example, CRI 1 indicates NZP CSI-RS resource #1-2 or NZP CSI-RS resource #2-2 depending on the value of CRSI.

Since the higher layer parameter reportQuantity is set to 'cri-RSRP', the CSI report includes a 1-bit CRSI indicating whether CRI #1 indicates an NZP CSI-RS resource from NZP CSI-RS resource set #1 or from NZP CSI-RS resource set #2. CRSI=0 indicates that CRI #1 indicates an NZP CSI-RS resource from NZP CSI-RS resource set #1; while CRSI=1 indicates that CRI #1 indicates an NZP CSI-RS resource from NZP CSI-RS resource set #2.

For example, if CRSI=0 and the value of CRI #1 is CRI 1, CRI #1 indicates NZP CSI-RS resource #1-2. For another example, if CRSI=1 and the value of CRI #1 is CRI 3, CRI #1 indicates NZP CSI-RS resource #2-4.

The CSI Report 1 and the CSI Report 2 are examples of the first configuration of the CSI report according to the first embodiment. That is to say, all of the odd reported CRIs (i.e. CRI #1 and CRI #3) indicate resources from the same NZP CSI-RS resource set indicated by CRSI; while all of the even reported CRIs (i.e. CRI #2 and CRI #4) indicate resources from a different NZP CSI-RS resource set from the NZP CSI-RS resource set indicated by CRSI. For example, in CSI Report 1 (CRSI=0), each of CRI #1 and CRI #3 indicates an NZP CSI-RS resource from NZP CSI-RS resource set #1; while each of CRI #2 and CRI #4 indicates an NZP CSI-RS resource from NZP CSI-RS resource set #2. In CSI Report 2 (CRSI=1), each of CRI #1 and CRI #3 indicates an NZP CSI-RS resource from NZP CSI-RS resource set #2; while each of CRI #2 and CRI #4 indicates an NZP CSI-RS resource from NZP CSI-RS resource set #1. In the CSI Report 1 and the CSI Report 2, the resources indicated by CRI #(2n−1) and CRI #(2n) (n=1 or 2) (i.e. CRI #1 and CRI #2, or CRI #3 and CRI #4, each indicating a NZP CSI-RS resource from a different NZP CSI-RS resource set) can be received simultaneously received by the UE.

The CSI Report 3 and the CSI Report 4 are examples of the second configuration of the CSI report according to the first embodiment. That is to say, all of the first reported N (N=2) CRIs (i.e. CRI #1 and CRI #2) indicate resources from the same NZP CSI-RS resource set as the NZP CSI-RS resource set indicated by CRSI; while all of the last reported N (N=2) CRIs (i.e. CRI #3 and CRI #4) indicate resources from a different NZP CSI-RS resource set from the NZP CSI-RS resource set indicated by CRSI. For example, in CSI Report 3 (CRSI=0), each of CRI #1 and CRI #2 indicates an NZP CSI-RS resource from NZP CSI-RS resource set #1; while each of CRI #3 and CRI #4 indicates an NZP CSI-RS resource from NZP CSI-RS resource set #2. In CSI Report 4 (CRSI=1), each of CRI #1 and CRI #2 indicates an NZP CSI-RS resource from NZP CSI-RS resource set #2; while each of CRI #3 and CRI #4 indicates an NZP CSI-RS resource from NZP CSI-RS resource set #1. In the CSI Report 3 and the CSI Report 4, the resources indicated by the $n^{th}$ CRI in the first 2 reported CRIs and the $n^{th}$ CRI in the last 2 reported CRIs (n=1 or 2) (i.e. CRI #1 and CRI #3 or CRI #2 and CRI #4, each indicating a NZP CSI-RS resource from a different NZP CSI-RS resource set) can be received simultaneously received by the UE.

The NZP CSI-RS resource indicated by CRI #1 has the largest measured L1-RSRP value, which is quantized to a 7-bit value in the range [−140, −44] dBm with a step size of 1 dB. Therefore, the L1-RSRP for CRI #1 in each of the CSI Reports 1 to 4 has a bit length of 7 bits. The L1-RSRP value of each of the NZP CSI-RS resources indicated by CRI #2, CRI #3 and CRI #4 is represented by a differential L1-RSRP value relative to the largest measured L1-RSRP value (i.e. the value of CRI #1). Each of the differential L1-RSRP values is quantized to a 4-bit value with a step size of 2 dB. Therefore, each of the differential L1-RSRPs for CRI #2, CRI #3 and CRI #4 in each of the CSI Reports 1 to 4 has a bit length of 4 bits.

According to a second embodiment, one channel measurement resource (CMR) set consisting of two subsets (e.g. subset #1 and subset #2) is configured in a resource setting for channel measurement.

The channel measurement resource (CMR) set can be NZP CSI-RS resource set or CSI-SSB resource set. Each subset (subset #1 or subset #2) has the same number of resources. For example, subset #1 consists of first half of the resources within the CMR set; while subset #2 consists of last half of the resources within the CMR set. Each subset corresponds to one TRP, which means that all resources within a same subset are transmitted from a same TRP. For example, subset #1 corresponds to TRP #1 (i.e. all resources within subset #1 are transmitted from TRP #1), and subset #2 corresponds to TRP #2 (i.e. all resources within subset #2 are transmitted from TRP #2).

Similar to the first embodiment, the resource setting for channel measurement is associated with a CSI-ReportConfig IE, which has a higher layer parameter groupBasedBeamReporting, a higher layer parameter reportQuantity, and a higher layer parameter nrofReportedRSGroup. The higher layer parameter groupBasedBeamReporting is set to 'enabled' to enable group based beam report. The higher layer parameter reportQuantity can be set to 'cri-RSRP' which means that the CMR set includes NZP CSI-RS resources, or set to 'ssb-Index-RSRP' which means that the CMR set includes SSB resources. The higher layer parameter nrofReportedRSGroup is used to configure the number (N) of beam pairs in the CSI report.

Accordingly, the UE shall report N pairs of CRIs or SSBRIs (i.e. 2N CRIs or SSBRIs) in a CSI report, where each CRI or SSBRI indicates an NZP CSI-RS resource or SSB resource.

Different from the first embodiment, the gNB knows which CRI or SSBRI belongs to which subset. For example, the first half of CRIs or SSBRIs (i.e. CRI 0 or SSBRI 0 to CRI $K_s−1$ or SSBRI $K_s−1$, where $K_s$ is the number of the resources (e.g. NZP CSI-RS resources or SSB resources) within each subset (i.e. $2K_s$ is the number of the resources within the CMR set) belong to subset #1, and the last half of CRIs or SSBRIs (i.e. CRI $K_s$ or SSBRI $K_s$ to CRI $2K_s−1$ or SSBRI $2K_s−1$) belong to subset #2. Therefore, it is unnecessary for the CSI report according to the second embodiment to include the CSI-RS resource set indicator (CRSI) or the SSB resource set indicator (SSBRSI).

In a first configuration of the CSI report according to the second embodiment, the resources indicated by all of the $(2n−1)^{th}$ reported CRIs or SSBRIs are from one subset (e.g. one of subset #1 and subset #2) (n is from 1 to N), and the resources indicated by all of the $(2n)^{th}$ reported CRIs or SSBRIs are from the other subset (e.g. the other of subset #1 and subset #2). In this condition, the resource indicated by each $(2n−1)^{th}$ reported CRI or SSBRI and the resource indicated by each $(2n)^{th}$ reported CRI or SSBRI can be received simultaneously by the UE either with a single spatial domain receive filter, or with multiple simultaneous spatial domain receive filters.

In a second configuration of the CSI report according to the second embodiment, the first N reported CRIs or SSBRIs indicate resources from one subset (e.g. one of subset #1 and subset #2), and the last N reported CRIs or SSBRIs indicate resources from the other subset (e.g. the other of subset #1 and subset #2). In this condition, the resource indicated by the $n^{th}$ CRI or SSBRI in the first N reported CRIs or SSBRIs and the resource indicated by the $n^{th}$ CRI or SSBRI in the last N reported CRIs or SSBRIs (n is from 1 to N) can be received simultaneously received by the UE, either with a single spatial domain receive filter, or with multiple simultaneous spatial domain receive filters.

The bit width of each of 2N CRIs or SSBRIs in the CSI report is determined by $\lceil \log_2(2K_s) \rceil$. $\lceil \log_2(2K_s) \rceil$ means the smallest integer that is equal to or larger than $\log_2(2K_s)$. Each of 2N CRIs or SSBRIs (CRI #1 or SSBRI #1, CRI #2 or SSBRI #2, CRI #2N or SSBRI #2N) has a value CRI k (k is from 0 to $2K_s−1$). Note that each of a half of 2N CRIs or SSBRIs has a value from CRI 0 to CRI $K_s−1$ (i.e. indicating resources from one subset), while each of another half of 2N CRIs or SSBRIs has a value from CRI $K_s$ to CRI $2K_s−1$ (i.e. indicating resources from the other subset). CRI k indicates the configured $(k+1)^{th}$ entry of the NZP CSI-RS resources or SSB resources in the CMR set.

According to the second embodiment, similar to the first embodiment, an L1-RSRP value or a differential L1-RSRP value of the resource indicated by each of 2N CRIs or SSBRIs is also included in the CSI report. The first reported NZP CSI-RS resource (indicated by CRI) or SSB resource (indicated by SSBRI) has the largest measured L1-RSRP value, which is quantized to a 7-bit value in the range [−140, −44] dBm with a step size of 1 dB. Each of the measured L1-RSRP values of the other reported NZP CSI-RS resources or SSB resources than the first reported NZP CSI-RS resource or SSB resource is represented by a differential L1-RSRP value relative to the largest measured L1-RSRP value, where each differential L1-RSRP value is quantized to a 4-bit value with a step size of 2 dB.

Figure 2:
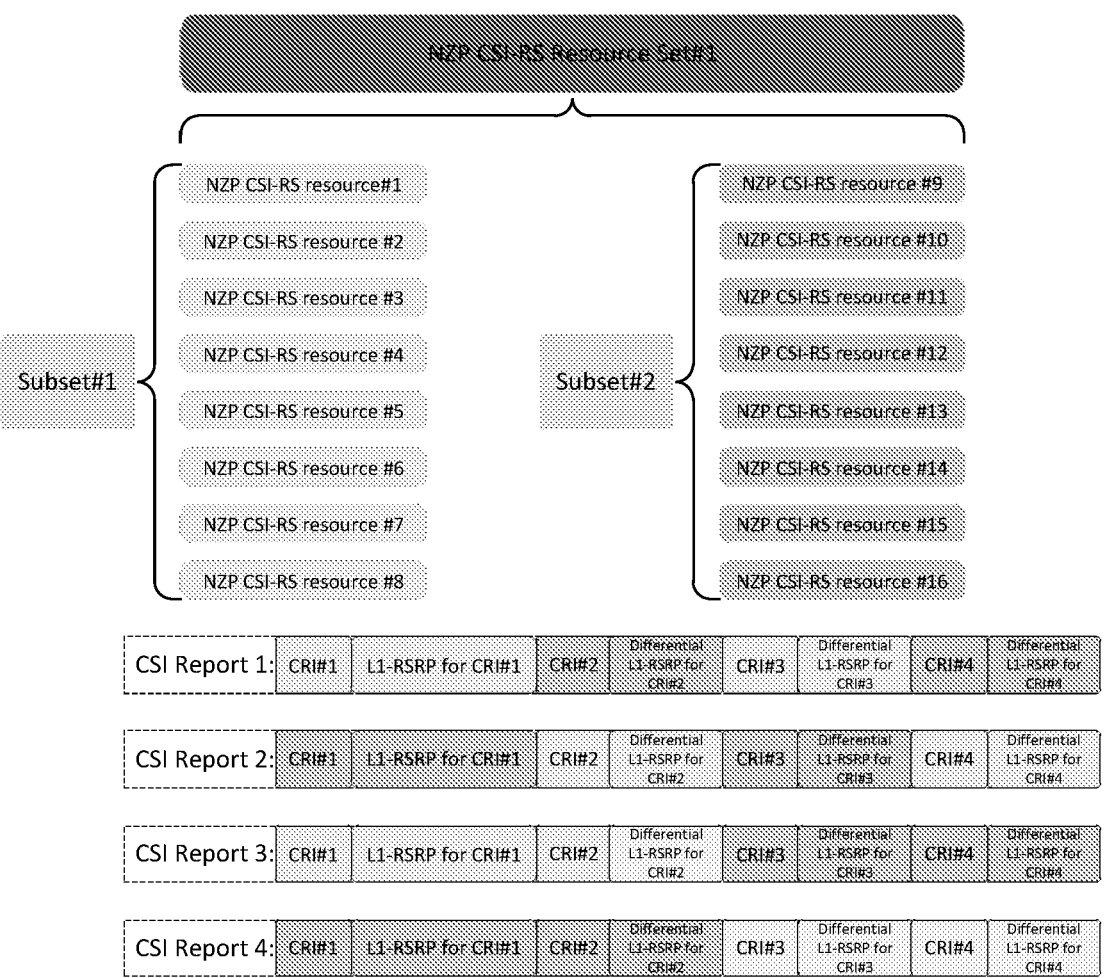
FIG. 2 illustrates an example of the resource setting and the CSI reports according to a second embodiment.

FIG. 2 illustrates an example of the resource setting and the CSI reports according to the second embodiment.

In the example c of FIG. 2, the higher layer parameter groupBasedBeamReporting is set to 'enabled' to enable group based beam report.

The higher layer parameter reportQuantity is set to 'cri-RSRP'. Accordingly, the resource setting for channel measurement has one NZP CSI-RS resource set: NZP CSI-RS resource set #1 containing for example 16 (i.e. $K_s$=8) NZP CSI-RS resources (e.g. NZP CSI-RS resource #1, NZP CSI-RS resource #2, . . . , NZP CSI-RS resource #16), in which NZP CSI-RS resource #1, NZP CSI-RS resource #2, . . . , NZP CSI-RS resource #8 belong to subset #1; and NZP CSI-RS resource #9, NZP CSI-RS resource #10, . . . , NZP CSI-RS resource #16 belong to subset #2.

The higher layer parameter nrofReportedRSGroup is set to 2 (i.e. N=2). Accordingly, the CSI report includes 2N (i.e. 4) CRIs (e.g. CRI #1, CRI #2, CRI #3 and CRI #4) and the L1-RSRP value or differential L1-RSRP values of resources indicated by the 4 CRIs. The bit width of each of CRI #1, CRI #2, CRI #3 and CRI #4 is $\lceil\log_2(2K_s)\rceil$=$\log_2(2*8)$=4 bits. The possible values of each of CRI #1, CRI #2, CRI #3 and CRI #4 are CRI 0, CRI 1, . . . , and CRI 15. CRI k (k=0 to 15) indicates NZP CSI-RS resource #(k+1). For example, CRI 1 indicates NZP CSI-RS resource #2. Note that each of a half of 4 CRIs has a value from CRI 0 to CRI 7 (i.e. indicating resources from one subset), while each of another half of 4 CRIs has a value from CRI 8 to CRI 15 (i.e. indicating resources from the other subset).

The CSI Report 1 and the CSI Report 2 are examples of the first configuration of the CSI report according to the second embodiment. That is to say, all of the odd reported CRIs (i.e. CRI #1 and CRI #3) indicate resources from the one subset; while all of the even reported CRIs (i.e. CRI #2 and CRI #4) indicate resources from the other subset. For example, in CSI Report 1, each of CRI #1 and CRI #3 indicates an NZP CSI-RS resource from subset #1 (i.e. has possible values from CRI 0 to CRI 7); while each of CRI #2 and CRI #4 indicates an NZP CSI-RS resource from subset #2 (i.e. has possible values from CRI 8 to CRI 15). In CSI Report 2, each of CRI #1 and CRI #3 indicates an NZP CSI-RS resource from subset #2 (i.e. has possible values from CRI 8 to CRI 15); while each of CRI #2 and CRI #4 indicates an NZP CSI-RS resource from subset #1 (i.e. has possible values from CRI 0 to CRI 7). In the CSI Report 1 and the CSI Report 2, the resources indicated by CRI #2n−1 and CRI #2n (n=1 or 2) (i.e. CRI #1 and CRI #2, or CRI #3 and CRI #4, each indicating a NZP CSI-RS resource from a different subset) can be received simultaneously received by the UE.

The CSI Report 3 and the CSI Report 4 are examples of the second configuration of the CSI report according to the second embodiment. That is to say, all of the first reported N (N=2) CRIs (i.e. CRI #1 and CRI #2) indicate resources from one subset; while all of the last reported N (N=2) CRIs (i.e. CRI #3 and CRI #4) indicate resources from another subset. For example, in CSI Report 3, each of CRI #1 and CRI #2 indicates an NZP CSI-RS resource from subset #1 (i.e. has possible values from CRI 0 to CRI 7); while each of CRI #3 and CRI #4 indicates an NZP CSI-RS resource from subset #2 (i.e. has possible values from CRI 8 to CRI 15). In CSI Report 4, each of CRI #1 and CRI #2 indicates an NZP CSI-RS resource from subset #2 (i.e. has possible values from CRI 8 to CRI 15); while each of CRI #3 and CRI #4 indicates an NZP CSI-RS resource from subset #1 (i.e. has possible values from CRI 0 to CRI 7). In the CSI Report 3 and the CSI Report 4, the resources indicated by the $n^{th}$ CRI in the first 2 reported CRIs and the $n^{th}$ CRI in the last 2 reported CRIs (n=1 or 2) (i.e. CRI #1 and CRI #3 or CRI #2 and CRI #4, each indicating a NZP CSI-RS resource from a different subset) can be received simultaneously received by the UE.

The NZP CSI-RS resource indicated by CRI #1 has the largest measured L1-RSRP value, which is quantized to a 7-bit value in the range [−140, −44] dBm with a step size of 1 dB. Therefore, the L1-RSRP for CRI #1 in each of CSI Reports 1 to 4 has a bit length of 7 bits. The L1-RSRP value of each of the NZP CSI-RS resources indicated by CRI #2, CRI #3 and CRI #4 is represented by a differential L1-RSRP value relative to the largest measured L1-RSRP value (i.e. the value of CRI #1). Each of the differential L1-RSRP values is quantized to a 4-bit value with a step size of 2 dB. Therefore, each of the differential L1-RSRPs for CRI #2, CRI #3 and CRI #4 in each of the CSI Reports 1 to 4 has a bit length of 4 bits.

FIG. 3 is a schematic flow chart diagram illustrating an embodiment of a method 300 according to the present application. In some embodiments, the method 300 is performed by an apparatus, such as a remote unit (UE). In certain embodiments, the method 300 may be performed by a processor executing program code, for example, a microcontroller, a microprocessor, a CPU, a GPU, an auxiliary processing unit, a FPGA, or the like.

The method 300 may include 302 receiving a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and 304 transmitting a CSI report including N pairs of CRIs or SSBRIs and the measured L1-RSRP value of the resource indicated by each of the N pairs of CRIs or SSBRIs.

In one embodiment, two CMR sets, each of which consists of the same number of resources, are configured, and the CSI report further includes a CRSI or SSBRSI indicating the CMR set to which the first reported CRI or SSBRI belongs. The bit width of each CRI or SSBRI is determined by the smallest integer that is equal to or larger than $\log_2(K_s)$, where $K_s$ is the number of the resources within each CMR set. The resource indicated by the $(2n-1)^{th}$ reported CRI or SSBRI and the resource indicated by the $(2n)^{th}$ reported CRI or SSBRI are from different CMR sets and can be received simultaneously by the UE either with a single spatial domain receive filter or with multiple simultaneous spatial domain receive filters, where n=1, 2 . . . , N. All of the resources indicated by the first N reported CRIs or SSBRIs are from one CMR set of the two CMR sets, and all of the resources indicated by the last N reported CRIs or SSBRIs are from the other CMR set of the two CMR sets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where n=1, 2, . . . , N.

In another embodiment, one CMR set including two subsets is configured, the one CMR set consists of $2K_s$ resources, and a first subset consists of first $K_s$ resources, and a second subset consists of last $K_s$ resources. The bit width of each CRI or SSBRI is determined by the smallest integer that is equal to or larger than $\log_2(2K_s)$. The resource indicated by the $(2n-1)^{th}$ reported CRI or SSBRI and the resource indicated by the $(2n)^{th}$ reported CRI or SSBRI are from different subsets and can be received simultaneously by the UE either with a single spatial domain receive filter or with multiple simultaneous spatial domain receive filters, where n=1, 2, . . . , N. All of first N reported CRIs or SSBRIs are from one subset of the two subsets, and all of last N reported CRIs or SSBRIs are from the other subset of the two subsets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where n=1, 2, . . . , N.

The resource indicated by the first reported CRI or SSBRI has the largest measured L1-RSRP value among all resources within the one or two CMR sets, and the largest measured L1-RSRP value is quantized to a 7-bit value in the range [−140, −44] dBm with step size of 1 dB. Each of the measure L1-RSRP values for the resources indicated by the other CRIs or SSBRIs other than the first reported CRI or SSBRI is represented by a differential L1-RSRP value relative to the largest measured L1-RSRP value, and the differential L1-RSRP value is quantized to a 4-bit value with step size of 2 dB.

FIG. 4 is a schematic flow chart diagram illustrating a further embodiment of a method 400 according to the present application. In some embodiments, the method 400 is performed by an apparatus, such as a base unit. In certain embodiments, the method 400 may be performed by a processor executing program code, for example, a microcontroller, a microprocessor, a CPU, a GPU, an auxiliary processing unit, a FPGA, or the like.

The method 400 may include 402 transmitting a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and 404 receiving a CSI report including N pairs of CRIs or SSBRIs and the measured L1-RSRP value of the resource indicated by each of the N pairs of CRIs or SSBRIs.

In one embodiment, two CMR sets, each of which consists of the same number of resources, are configured, and the CSI report further includes a CRSI or SSBRSI indicating the CMR set to which the first reported CRI or SSBRI belongs. The bit width of each CRI or SSBRI is determined by the smallest integer that is equal to or larger than $\log_2(K_s)$, where $K_s$ is the number of the resources within each CMR set. The resource indicated by the $(2n-1)^{th}$ reported CRI or SSBRI and the resource indicated by the $(2n)^{th}$ reported CRI or SSBRI are from different CMR sets and can be received simultaneously by the UE either with a single spatial domain receive filter or with multiple simultaneous spatial domain receive filters, where n=1, 2, . . . , N. All of the resources indicated by the first N reported CRIs or SSBRIs are from one CMR set of the two CMR sets, and all of the resources indicated by the last N reported CRIs or SSBRIs are from the other CMR set of the two CMR sets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where n=1, 2, . . . , N.

In another embodiment, one CMR set including two subsets is configured, the one CMR set consists of $2K_s$ resources, and a first subset consists of first $K_s$ resources, and a second subset consists of last $K_s$ resources. The bit width of each CRI or SSBRI is determined by the smallest integer that is equal to or larger than $\log_2(2K_s)$. The resource indicated by the $(2n-1)^{th}$ reported CRI or SSBRI and the resource indicated by the $(2n)^{th}$ reported CRI or SSBRI are from different subsets and can be received simultaneously by the UE either with a single spatial domain receive filter or with multiple simultaneous spatial domain receive filters, where n=1, 2, . . . , N. All of first N reported CRIs or SSBRIs are from one subset of the two subsets, and all of last N reported CRIs or SSBRIs are from the other subset of the two subsets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where n=1, 2, . . . , N.

The resource indicated by the first reported CRI or SSBRI has the largest measured L1-RSRP value among all resources within the one or two CMR sets, and the largest measured L1-RSRP value is quantized to a 7-bit value in the range [−140, −44] dBm with step size of 1 dB. Each of the measure L1-RSRP values for the resources indicated by the other CRIs or SSBRIs other than the first reported CRI or SSBRI is represented by a differential L1-RSRP value relative to the largest measured L1-RSRP value, and the differential L1-RSRP value is quantized to a 4-bit value with step size of 2 dB.

FIG. 5 is a schematic block diagram illustrating apparatuses according to one embodiment.

Referring to FIG. 5, the UE (i.e. the remote unit) includes a processor, a memory, and a transceiver. The processor implements a function, a process, and/or a method which are proposed in FIG. 3.

The UE comprises a receiver that receives a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and a transmitter that transmits a CSI report including N pairs of CRIs or SSBRIs and the measured L1-RSRP value of the resource indicated by each of the N pairs of CRIs or SSBRIs.

In one embodiment, two CMR sets, each of which consists of the same number of resources, are configured, and the CSI report further includes a CRSI or SSBRSI indicating the CMR set to which the first reported CRI or SSBRI belongs. The bit width of each CRI or SSBRI is determined by the smallest integer that is equal to or larger than $\log_2(K_s)$, where $K_s$ is the number of the resources within each CMR set. The resource indicated by the $(2n-1)^{th}$ reported CRI or SSBRI and the resource indicated by the $(2n)^{th}$ reported CRI or SSBRI are from different CMR sets and can be received simultaneously by the UE either with a single spatial domain receive filter or with multiple simultaneous spatial domain receive filters, where $n=1, 2, \ldots, N$. All of the resources indicated by the first N reported CRIs or SSBRIs are from one CMR set of the two CMR sets, and all of the resources indicated by the last N reported CRIs or SSBRIs are from the other CMR set of the two CMR sets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

In another embodiment, one CMR set including two subsets is configured, the one CMR set consists of $2K_s$ resources, and a first subset consists of first $K_s$ resources, and a second subset consists of last $K_s$ resources. The bit width of each CRI or SSBRI is determined by the smallest integer that is equal to or larger than $\log_2(2K_s)$. The resource indicated by the $(2n-1)^{th}$ reported CRI or SSBRI and the resource indicated by the $(2n)^{th}$ reported CRI or SSBRI are from different subsets and can be received simultaneously by the UE either with a single spatial domain receive filter or with multiple simultaneous spatial domain receive filters, where $n=1, 2, \ldots, N$. All of first N reported CRIs or SSBRIs are from one subset of the two subsets, and all of last N reported CRIs or SSBRIs are from the other subset of the two subsets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

The resource indicated by the first reported CRI or SSBRI has the largest measured L1-RSRP value among all resources within the one or two CMR sets, and the largest measured L1-RSRP value is quantized to a 7-bit value in the range $[-140, -44]$ dBm with step size of 1 dB. Each of the measure L1-RSRP values for the resources indicated by the other CRIs or SSBRIs other than the first reported CRI or SSBRI is represented by a differential L1-RSRP value relative to the largest measured L1-RSRP value, and the differential L1-RSRP value is quantized to a 4-bit value with step size of 2 dB.

Referring to FIG. 5, the gNB (i.e. base unit) includes a processor, a memory, and a transceiver. The processors implement a function, a process, and/or a method which are proposed in FIG. 4.

The base unit comprises a transmitter that transmits a configuration of one or two CMR sets for channel measurement associated with a CSI-ReportConfig IE with groupBasedBeamReporting set to 'enabled', reportQuantity set to 'cri-RSRP' or 'ssb-Index-RSRP', and nrofReportedRSGroup indicating the number N of beam pairs, N is 2 or more; and a receiver that receives a CSI report including N pairs of CRIs or SSBRIs and the measured L1-RSRP value of the resource indicated by each of the N pairs of CRIs or SSBRIs.

In one embodiment, two CMR sets, each of which consists of the same number of resources, are configured, and the CSI report further includes a CRSI or SSBRSI indicating the CMR set to which the first reported CRI or SSBRI belongs. The bit width of each CRI or SSBRI is determined by the smallest integer that is equal to or larger than $\log_2(K_s)$, where $K_s$ is the number of the resources within each CMR set. The resource indicated by the $(2n-1)^{th}$ reported CRI or SSBRI and the resource indicated by the $(2n)^{th}$ reported CRI or SSBRI are from different CMR sets and can be received simultaneously by the UE either with a single spatial domain receive filter or with multiple simultaneous spatial domain receive filters, where $n=1, 2, \ldots, N$. All of the resources indicated by the first N reported CRIs or SSBRIs are from one CMR set of the two CMR sets, and all of the resources indicated by the last N reported CRIs or SSBRIs are from the other CMR set of the two CMR sets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

In another embodiment, one CMR set including two subsets is configured, the one CMR set consists of $2K_s$ resources, and a first subset consists of first $K_s$ resources, and a second subset consists of last $K_s$ resources. The bit width of each CRI or SSBRI is determined by the smallest integer that is equal to or larger than $\log_2(2K_s)$. The resource indicated by the $(2n-1)^{th}$ reported CRI or SSBRI and the resource indicated by the $(2n)^{th}$ reported CRI or SSBRI are from different subsets and can be received simultaneously by the UE either with a single spatial domain receive filter or with multiple simultaneous spatial domain receive filters, where $n=1, 2, \ldots, N$. All of first N reported CRIs or SSBRIs are from one subset of the two subsets, and all of last N reported CRIs or SSBRIs are from the other subset of the two subsets, and the resource indicated by the $n^{th}$ reported CRI or SSBRI of the first N reported CRIs or SSBRIs and the resource indicated by the $n^{th}$ reported CRI or SSBRI of the last N reported CRIs or SSBRIs can be received simultaneously by the UE either with a single spatial domain receive filter or with multiple simultaneous spatial domain receive filters, where $n=1, 2, \ldots, N$.

The resource indicated by the first reported CRI or SSBRI has the largest measured L1-RSRP value among all resources within the one or two CMR sets, and the largest measured L1-RSRP value is quantized to a 7-bit value in the range $[-140, -44]$ dBm with step size of 1 dB. Each of the measure L1-RSRP values for the resources indicated by the other CRIs or SSBRIs other than the first reported CRI or SSBRI is represented by a differential L1-RSRP value relative to the largest measured L1-RSRP value, and the differential L1-RSRP value is quantized to a 4-bit value with step size of 2 dB.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE) for wireless communication, comprising:

at least one memory; and at least one processor coupled with the at least one memory and configured to cause the UE to:

receive a configuration of two channel measurement resource (CMR) sets for channel measurement associated with a CSI-ReportConfig information element (IE) with groupBasedBeamReporting set to 'enabled', reportQuantity set to 'cri-RSRP' or 'ssb-Index-RSRP', and nrofReportedRSGroup indicating a number N of beam pairs, wherein N is 2 or more; and transmit a channel state information (CSI) report including:

N pairs of one or more of CSI reference signal (RS) resource indicators (CRI) or synchronization signal block (SSB) resource indicators (RI) (SSBRIs), and a measured L1 reference signal received power (RSRP) value of a resource indicated by each of the N pairs of one or more of CRIs or SSBRIs, and at least one of a CSI-RS resource set indicator (CRSI) or an SSB resource set indicator (SSBRSI) that indicates a CMR set to which a first reported CRI or SSBRI belongs, wherein a resource indicated by the first reported CRI or SSBRI has a largest measured L1-RSRP value among resources within the two CMR sets.

2. The UE of claim 1, wherein:

a bit width of each CRI or SSBRI is determined by a smallest integer that is equal to or larger than $\log_2(K_s)$, where $K_s$ is the number of the resources within each CMR set.

3. The UE of claim 1, wherein:

the largest measured L1-RSRP value is quantized to a 7-bit value in a range [−140, −44] dBm with step size of 1 dB.

4. The UE of claim 3, wherein:

each of the measured L1-RSRP values for the resources indicated by one or more other CRIs or SSBRIs other than the first reported CRI or SSBRI is represented by a differential L1-RSRP value relative to the largest measured L1-RSRP value; and the differential L1-RSRP value is quantized to a 4-bit value with step size of 2 dB.

5. The UE of claim 1, wherein a resource indicated by a $(2n-1)^{th}$ reported CRI or SSBRI and the resource indicated by a $(2n)^{th}$ reported CRI or SSBRI are from different CMR sets and are receivable simultaneously by the UE either with a single spatial domain receive filter or with multiple simultaneous spatial domain receive filters, where n=1, 2, . . . , N.

6. The UE of claim 1, wherein resources indicated by a first N reported one or more CRIs or SSBRIs are from one CMR set of the two CMR sets, and resources indicated by a last N reported one or more CRIs or SSBRIs are from another CMR set of the two CMR sets, and a resource indicated by an $n^{th}$ reported CRI or SSBRI of the first N reported CRIs or SSBRIs and the resource indicated by the $n^{th}$ reported CRI or SSBRI of a last N reported CRIs or SSBRIs are receivable simultaneously by the UE either with a single spatial domain receive filter or with multiple simultaneous spatial domain receive filters, where n=1, 2, . . . , N.

7. A base station for wireless communication, comprising:

at least one memory; and at least one processor coupled with the at least one memory and configured to cause the base station to:

transmit a configuration of two channel measurement resource (CMR) sets for channel measurement associated with a CSI-ReportConfig information element (IE) with groupBasedBeamReporting set to 'enabled', reportQuantity set to 'cri-RSRP' or 'ssb-Index-RSRP', and nrofReportedRSGroup indicating a number N of beam pairs, wherein N is 2 or more; and receive a channel state information (CSI) report including:

N pairs of one or more of CSI reference signal (RS) resource indicators (CRI) or synchronization signal block (SSB) resource indicators (RI) (SSBRIs), and a measured L1 reference signal received power (RSRP) value of a resource indicated by each of the N pairs of one or more of CRIs or SSBRIs, and at least one of a CSI-RS resource set indicator (CRSI) or an SSB resource set indicator (SSBRSI) that indicates a CMR set to which a first reported CRI or SSBRI belongs, wherein a resource indicated by the first reported CRI or SSBRI has a largest measured L1-RSRP value among resources within the two CMR sets.

8. The base station of claim 7, wherein:

a bit width of each CRI or SSBRI is determined by a smallest integer that is equal to or larger than $\log_2(K_s)$, where $K_s$ is the number of the resources within each CMR set.

9. The base station of claim 7, wherein:

the largest measured L1-RSRP value is quantized to a 7-bit value in a range [−140, −44] dBm with step size of 1 dB.

10. The base station of claim 9, wherein:

each of the measured L1-RSRP values for the resources indicated by one or more other CRIs or SSBRIs other than the first reported CRI or SSBRI is represented by a differential L1-RSRP value relative to the largest measured L1-RSRP value; and the differential L1-RSRP value is quantized to a 4-bit value with step size of 2 dB.

11. A processor for wireless communication, comprising:

at least one controller coupled with the processor and configured to cause the processor to:

receive a configuration of two channel measurement resource (CMR) sets for channel measurement associated with a CSI-ReportConfig information element (IE) with groupBasedBeamReporting set to 'enabled', reportQuantity set to 'cri-RSRP' or 'ssb-Index-RSRP', and nrofReportedRSGroup indicating a number N of beam pairs, wherein N is 2 or more; and transmit a channel state information (CSI) report including:

N pairs of one or more of CSI reference signal (RS) resource indicators (CRI) or synchronization signal block (SSB) resource indicators (RI) (SSBRIs), and a measured L1 reference signal received power (RSRP) value of a resource indicated by each of the N pairs of one or more of CRIs or SSBRIs, and at least one of a CSI-RS resource set indicator (CRSI) or an SSB resource set indicator (SSBRSI) that indicates a CMR set to which a first reported CRI or SSBRI belongs, wherein a resource indicated by the first reported CRI or SSBRI has a largest measured L1-RSRP value among resources within the two CMR sets.

12. The processor of claim 11, wherein:

a bit width of each CRI or SSBRI is determined by a smallest integer that is equal to or larger than $\log_2(K_s)$, where $K_s$ is the number of the resources within each CMR set.

13. The processor of claim 11, wherein:

the largest measured L1-RSRP value is quantized to a 7-bit value in a range [−140, −44] dBm with step size of 1 dB.

14. The processor of claim 13, wherein:

each of the measured L1-RSRP values for the resources indicated by one or more other CRIs or SSBRIs other than the first reported one or more of the CRI or the SSBRI is represented by a differential L1-RSRP value relative to the largest measured L1-RSRP value; and the differential L1-RSRP value is quantized to a 4-bit value with step size of 2 dB.

15. A method performed by a user equipment (UE), the method comprising:

receiving a configuration of two channel measurement resource (CMR) sets for channel measurement associated with a CSI-ReportConfig information element (IE) with groupBasedBeamReporting set to 'enabled', reportQuantity set to 'cri-RSRP' or 'ssb-Index-RSRP', and nrofReportedRSGroup indicating a number N of beam pairs, wherein N is 2 or more; and transmitting a channel state information (CSI) report including:

N pairs of one or more of CSI reference signal (RS) resource indicators (CRI) or synchronization signal block (SSB) resource indicators (RI) (SSBRIs), and a measured L1 reference signal received power (RSRP) value of a resource indicated by each of the N pairs of one or more of CRIs or SSBRIs, and at least one of a CSI-RS resource set indicator (CRSI) or an SSB resource set indicator (SSBRSI) that indicates a CMR set to which a first reported CRI or SSBRI belongs, wherein a resource indicated by the first reported CRI or SSBRI has a largest measured L1-RSRP value among resources within the two CMR sets.

16. The method of claim 15, wherein:

a bit width of each CRI or SSBRI is determined by a smallest integer that is equal to or larger than $\log_2(K_s)$, where $K_s$ is the number of the resources within each CMR set.

17. The method of claim 15, wherein:

the largest measured L1-RSRP value is quantized to a 7-bit value in a range [−140, −44] dBm with step size of 1 dB.

18. The method of claim 17, wherein:

each of the measured L1-RSRP values for the resources indicated by one or more other CRIs or SSBRIs other than the first reported CRI or SSBRI is represented by a differential L1-RSRP value relative to the largest measured L1-RSRP value; and the differential L1-RSRP value is quantized to a 4-bit value with step size of 2 dB.

19. The method of claim 15, wherein a resource indicated by a $(2n-1)^{th}$ reported CRI or SSBRI and the resource indicated by a $(2n)^{th}$ reported CRI or SSBRI are from different CMR sets and are receivable simultaneously by the UE either with a single spatial domain receive filter or with multiple simultaneous spatial domain receive filters, where n=1, 2, . . . , N.

20. The method of claim 15, wherein resources indicated by a first N reported one or more CRIs or SSBRIs are from one CMR set of the two CMR sets, and resources indicated by a last N reported one or more CRIs or SSBRIs are from another CMR set of the two CMR sets, and a resource indicated by an $n^{th}$ reported CRI or SSBRI of the first N reported CRIs or SSBRIs and the resource indicated by the $n^{th}$ reported CRI or SSBRI of a last N reported CRIs or SSBRIs are receivable simultaneously by the UE either with a single spatial domain receive filter or with multiple simultaneous spatial domain receive filters, where n=1, 2, . . . , N.

* * * * *